United States Patent

Shindo et al.

[11] Patent Number: 6,045,947
[45] Date of Patent: *Apr. 4, 2000

[54] ELECTRODE PLATE FOR SECONDARY BATTERY WITH NONAQUEOUS ELECTROLYTE AND METHOD OF MANUFACTURING THE SAME

[75] Inventors: Tadafumi Shindo; Yasushi Sato; Yuichi Miyazaki, all of Tokyo-to, Japan

[73] Assignee: Dai Nippon Printing Co., Ltd., Tokyo-to, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/745,261

[22] Filed: Nov. 8, 1996

[30] Foreign Application Priority Data

Nov. 11, 1995 [JP] Japan ...................... 7-317277

[51] Int. Cl.⁷ ............................................ H01M 4/62
[52] U.S. Cl. ................... 429/217; 429/218.1; 29/623.5
[58] Field of Search .................................. 429/217, 212, 429/218, 233, 234; 29/623.5

[56] References Cited

U.S. PATENT DOCUMENTS 5,631,100  5/1997  Yoshino et al. ............................ 429/62

*Primary Examiner*—Kathryn Gorgos
*Assistant Examiner*—Thomas H Parsons
*Attorney, Agent, or Firm*—Ladas & Parry

[57] ABSTRACT

An electrode plate for a secondary battery with nonaqueous electrolyte comprises a collector and a coated layer formed on the collector by coating a coating solution at least containing an electrode active material and a binder on the collector and then drying the same, wherein a ratio (b/a) of an amount (b) of a binder existing at a boundary portion of the coated layer on a side opposite to a collector side to an amount (a) of a binder existing at a boundary portion of the coated layer contacting the collector is 0.05 or more and less than 2. The manufacturing method of the electrode plate comprises the step of forming a coated layer having a predetermined thickness by repeating at least two times of coating and drying processes for coating the coating solution, wherein a thickness of a coated layer formed in a second time or more than second time coating and drying processes is increased by an amount in a range of 0.4 to 1.6 time of a thickness of a coated layer already formed in preceding coating and drying processes, or wherein an increased amount in weight per unit area of the coated layer formed in a second time or more than second time coating and drying processes is in a range of 0.6 to 1.6 time of a weight per unit area of a coated layer already formed in preceding coating and drying processes.

27 Claims, 1 Drawing Sheet

ELECTRODE PLATE FOR SECONDARY BATTERY WITH NONAQUEOUS ELECTROLYTE AND METHOD OF MANUFACTURING THE SAME

BACKGROUND OF THE INVENTION

The present invention relates to an electrode plate for a secondary battery with nonaqueous electrolyte such as represented by a lithium ion secondary battery and also relates to a method of manufacturing the same.

In recent years compact in size and light in weight, electronic equipment, communications equipment and the like, have been rapidly developed, and it has been required that the secondary batteries used for the driving electric power sources of this equipment also be reduced in size and in weight. According to, there has been proposed a secondary battery with nonaqueous electrolyte such as that represented by a lithium ion secondary battery having high energy density and high voltage.

Furthermore, concerning electrode plates which severely affect the performance of the secondary battery, it has been also proposed to make large an area of a thin layer so as to elongate charge-discharge cycle life and to make the energy density high.

In a prior art publication such as Japanese Patent Laid-open Publication No. SHO 63-10456 or Japanese Patent Laid-open Publication No. HEI 3-285262, there is disclosed a positive electrode plate which is obtained in a manner such that a paste-form active material coating solution is prepared by dispersing or dissolving a conductive agent, binder powder and a positive electrode active material such as metallic oxide, sulfide, halide or the like, in a suitable wetting agent, and the coating solution is coated on a collecting element (or collector) as a substrate formed of a metal foil to thereby form a coated layer (battery active material layer). In such a process, fluorine series resin such as polyvinylidene fluoride, silicone-acrylic copolymer or styrene-butadiene copolymer is used as a binder.

With the coating-type electrode plate of the character described above, it is required for the binder used at a time of preparing the coating solution containing the active material to be electro-chemically stable to the nonaqueous electrolyte, not to be dissolved in the electrolyte and to be dissolved in a certain solvent. It is also required that the coating solution can be coated in a thin layer form on the substrate formed of a metal foil. Furthermore, it is further required for the active material layer (coated layer) formed through the coating and drying processes to have a flexibility so as not to be peeled off, removed or cracked during assembly of the batteries and also required to have an excellent adhesion to the collecting element formed of a metal foil.

The coated layer constituting the electrode plate generally has a layer thickness of about 50 to 200 $\mu$m per one surface thereof. The capacity of a battery per unit area can be increased by increasing this layer thickness of the coated layer.

However, when the thickness of the coated layer is increased, a convection flow is caused in the coated layer during the drying process, which results in uneven distribution of the binder amount in the coated layer after the drying process in such a fashion that the binder amount is decreased at a boundary portion of the coated layer contacting the collecting element (called contacting surface or contacting surface side hereinafter) and, on the contrary, the binder amount is increased at a boundary portion of the coated layer opposite to the contacting surface side. The latter boundary portion is exposed in air or exposed to an electrolyte when disposed in a battery (called exposed (or opposite) surface or exposed surface side hereinafter). In particular, in the case of the coated layer thickness more than 100 $\mu$m, such uneven distribution of the binder amount becomes more remarkable, which results in the damage of the adhesion performance of the coated layer with respect to the collecting element. At the same time, the coated layer becomes easily peelable from the collecting element because of the lowering of the adhesion property, and accordingly, the flexibility of the electrode plate will be reduced. Thus, it becomes difficult to carry out a bending working of the electrode plate. Such uneven distribution of the binder at the boundary portion of the exposed surface side of the coated layer appears remarkably as the drying speed increases, and accordingly, in order to prevent the adhesion performance between the coated layer and the collecting element from lowering and the flexibility of the coated layer from damaging, it is necessary to slow the drying speed, which however results in the lowering of the productivity.

In another viewpoint, in a case where the weight ratio of the binder/active material is made larger than 0.25, it is possible to prevent the lowering of the adhesion performance at the time of the rapid drying of the thickened coated layer. However, the increasing of the binder amount leads to extreme lowering of the battery performance, thus this countermeasure is not practical.

As described above, in the prior art, it was difficult to produce an electrode plate with a coated layer being relatively thick, containing a small amount of a binder and, moreover, having an excellent adhesion performance to a collecting element.

SUMMARY OF THE INVENTION

An object of the present invention is to substantially eliminate defects or drawbacks encountered in the prior art described above and to provide an electrode plate for a secondary battery with nonaqueous electrolyte and a method of manufacturing the same with high productivity capable of providing a coated layer which has an active material formed by coating an electrode coating solution on a substrate of a collecting element or collector and then drying the same and which has a sufficient battery capacity per unit area and sufficient flexibility with high workability.

The inventors of the subject application considered that, in the detailed studies and examinations to solve the above problems encountered in the prior art, the main reason for lowering of the adhesion performance of the coated layer to the collector at the time of increasing the thickness of the coated layer resides in that, in the prior art coating type electrode plate, the existence amount of the binder at the boundary portion of the coated layer contacting the collector is less than that at the boundary portion of the coated layer opposite (exposed side) to the contacting surface side. According to such a consideration, the inventors thought that, at the time of coating the coating solution, the sufficient adhesion performance between the coated layer and the collector surface can be obtained in the case where the distribution of the binder existence amount at the contacting side boundary portion is more than or substantially equal to the distribution thereof at the side of the coated layer opposite to the contacting side, and hence, the problems encountered in the prior art can be solved. The present invention was conceived in accordance with the above recognition of the inventors.

Thus, the above and other objects can be achieved according to the present invention by providing, in one aspect, an electrode plate for a secondary battery with a nonaqueous electrolyte comprising a collector and a coated layer formed on the collector by coating a coating solution containing at least an active material for a battery and a binder on the collector and then drying the same, wherein a ratio (b/a) of an amount (b) of a binder existing at a boundary portion of the coated layer on an opposite side to the collector side to an amount (a) of a binder existing at a boundary portion of the coated layer contacting the collector is 0.05 or more and less than 2.

In another aspect of the present invention, there is provided a method of manufacturing an electrode plate for a secondary battery with nonaqueous electrolyte comprising a collector and a coated layer formed on the collector by coating a coating solution containing at least an active material for a battery and a binder on the collector and then drying the same, wherein a ratio (b/a) of an amount (b) of a binder existing at a boundary portion of the coated layer on an opposite side to the collector side to an amount (a) of a binder existing at a boundary portion of the coated layer contacting the collector is 0.05 or more and less than 2, the method comprising the step of forming a coated layer having a predetermined thickness by repeating at least two times the coating and drying processes for coating the coating solution for the electrode plate containing on the collector and then drying the same, wherein a thickness of a coated layer formed in a second time or more than second time coating and drying processes is increased by an amount in a range of 0.4 to 1.6 times a thickness of a coated layer already formed in preceding coating and drying processes, or wherein an increased amount in weight per unit area of the coated layer formed in a second time or more than second time coating and drying processes is in a range of 0.6 to 1.6 times of a weight per unit area of a coated layer already formed in preceding coating and drying processes.

According to the present invention described above, at the time of forming the coated layer by coating the coating solution on the collector and then drying the same, the coated layer can be formed without reducing the existence amount of the binder at the boundary portion of the coated layer contacting the collector, and accordingly, the coated layer having a sufficient thickness can be formed without damaging the adhesion performance between the coated layer and the collector. Furthermore, according to the present invention, the drying speed can be made fast in comparison with the prior art method, so that the productivity of the electrode plates can be effectively improved.

BRIEF DESCRIPTION OF THE DRAWING

In the accompanying drawing, a single drawing of FIG. 1 represents a schematic sectional view of an electrode plate according to the present invention.

DESCRIPTION OF THE PREFERRED EMBODIMENTS

Figure 1:
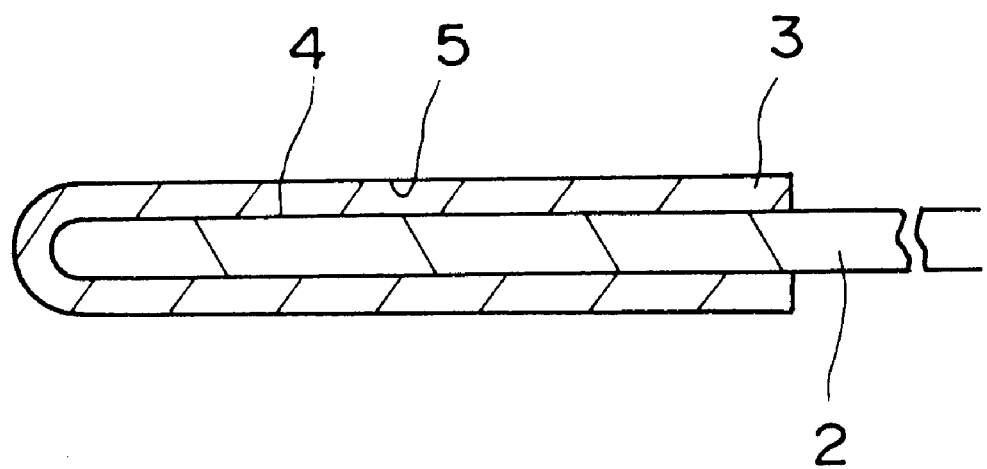

The present invention will be described hereunder with reference to FIG. 1 and preferred embodiments.

Referring to FIG. 1, an electrode plate 1 for a secondary battery with nonaqueous electrolyte according to the present invention is composed at least of a collecting element or collector 2 as a substrate and a coated layer 3 formed on the surface of the collecting element 2. The coated layer 3 is formed by coating a coating solution containing at least an active material and a binder on the collecting element 2 and drying the same. In the present invention, it is characterized that, with respect to the existence amount of the binder in the coated layer of the electrode plate for the secondary battery with the nonaqueous electrolyte, the existence amount of the binder at the contacting surface side 4 to the collecting element 2 is larger than or substantially equal to that at the exposed surface side 5.

In order to obtain the electrode plate for the secondary battery with nonaqueous electrolyte of the present invention having the structure mentioned above, it is desirable to prepare a coating solution for an electrode by kneading at least the active material and the binder and coat the thus prepared coating solution on the collecting element two or more times in a repeated manner to obtain a coated layer totally having a predetermined thickness. In the formation of the coating layer, the coating process is performed in a manner such that the thickness of an upper layer formed by being coated and dried in the second coating and drying process is in a range of 0.4 to 1.6 times of the thickness of a lower layer formed by being coated and dried in the first coating and drying process or in a range of 0.6 to 1.6 times the weight ratio, and in the case of coating processes three or more than three times, the thickness of an upper layer newly formed by each coating process is in a range of 0.4 to 1.6 times the thickness of the layer already formed, or in a range of 0.6 to 1.6 times the weight ratio.

The electrode plate of the present invention is characterized in that the existence amount of the binder in the coated layer is distributed in a fashion reverse to the distribution in the prior art mentioned hereinbefore, and that the existence amount of the binder at the contact surface of the coated layer to the collecting element is larger than or substantially equal to that at the opposite exposed surface of the coated layer, or even in a case where the existence amount of the binder at the contact surface of the coated layer to the collecting element is smaller than that at the opposite exposed surface of the coated layer, the difference of the existence binder amount between both the surface sides of the coated layer is made extremely small.

In the case where the coated layer having a predetermined thickness is formed as in the prior art by one (single) coating and drying process, since the coating solution is coated with relatively large thickness, a convection flow is caused in the coated layer during the drying process and the coated layer after the drying process includes a large amount of the binder at the exposed surf ace side, and on the contrary, a less amount of the binder at the contact surface side. This may result in the lowering of the adhesion performance, and the coated layer becomes easily peelable from the collector surface side at the time of working the electrode plate, which may also damage or reduce the flexibility of the electrode plate as a whole.

On the contrary, according to the present invention, since there is adapted the structure in which the binder exists largely in amount on the contact surface side to the collecting element, the adhesion performance between the substrate of the collecting element formed from a metal foil and the coated layer can be improved. Furthermore, the flexibility of the produced electrode plate can be more improved in the case where the coating and drying process is performed two or more than two times as in the present invention than in the case where the coating and drying process is performed only one time as in the prior art.

According to the present invention, with respect to the existence amount of the binder in the coated layer containing the active material and formed on the collecting element, although it is preferred that the existence amount of the binder at the contact surface of the coated layer to the collecting element is larger than or substantially equal to that at the opposite exposed surface of the coated layer, even in a case where the existence amount of the binder at the contact surface of the coated layer is smaller than that at the opposite exposed surface of the coated layer, substantially the same improved adhesion performance between the coated layer and the collecting element can be achieved if the difference of the existence binder amount between both the surfaces of the coated layer is made extremely small.

In the above description, the expression "substantially equal" means that a ratio (b/a) of the amount (b) of the binder existing at the exposed surface of the coated layer with respect to the amount (a) of the binder existing at the contact surface of the coated layer is less than 2, and in the case where this ratio of is 1.6 or less, especially desirable adhesion performance can be realized.

On the contrary, in the case of this ratio (b/a) being extremely small, although an improved adhesion performance is realized, several severe problems including a case that powder will fall from the exposed surface will be caused because of an extremely small amount of the binder at the exposed surface side of the coated layer. Accordingly, the ratio (b/a) of the amount (b) of the binder existing at the exposed surface of the coated layer with respect to the amount (a) of the binder existing at the contact surface of the coated layer is to be limited to a value 0.05, or more, preferably 0.5 or more in the present invention.

The existence amount of the binder at both the surfaces of the coated layer will be measured by, for example, "an X-ray photoelectron spectroscopy" (X-ray PS), which is a photoelectron spectroscopy using an X-ray for generating electrons, preferably, a single-color soft X-ray and which is excellent as a measuring means for obtaining information of a surface of a solid material. This X-ray photoelectron spectroscopy may be called "Electron Spectroscopy for Chemical Analysis" (ESCA).

In a case where a fluorine series resin is used as a binder, the existence amount of the fluorine atoms contained in the binder directly indicates the existence amount of the binder. Accordingly, in such case, it is possible to confirm the amount ratio of the binder by measuring the existence amounts of the fluorine atoms contained in the binder at both the surfaces of the coated layer and comparing the thus measured existence amounts of the fluorine atoms with each other. According to the X-ray PS, the existence amount of the fluorine atoms contained in the binder will be detected as a ratio of the existence amount of the fluorine atoms with respect to the existence amount of other atoms existing in the measured portion, i.e. as a composition ratio of the respective atoms existing in the measured portion. Then, the existence ratio of the atoms between the two boundary portions can be calculated by relatively comparing the fluorine atom amount existing at the exposed surface of the coated layer with the fluorine atom amount existing at the contact surface thereof with the existence amount of atoms substantially uniformly distributed in the coated layer being a reference. For the positive electrode, cobalt, nickel, manganese, vanadium or chromium can be used as the reference. These materials are active materials for the positive electrode, and since these materials hardly cause convention flows because of their large particle sizes and large gravities, these materials are uniformly distributed in the coated layer. On the other hand, in the negative electrode, carbon atom, which is one of active materials for the negative electrode, can be used as the reference. The carbon atom constitutes not only the active material for the negative electrode but also another component contained in the coated layer. For example, the fluorine series resin is an organic material including a large amount of carbon atoms, and accordingly, the carbon atoms are uniformly distributed in the coated layer for the negative electrode.

In the present invention, aluminum K$\alpha$-ray which is one kind of soft X-ray sources was used as an X-ray source. The measurement was performed with conditions of measuring region being 1100 $\mu$m$\phi$ and X-ray output being 15 kV and 35 mA. The fluorine atom amount in the coated layer was measured by utilizing a peak in a binding energy region from 685 to 692 eV. The cobalt atom amount was measured by utilizing a peak in a binding energy region near 780 eV and the carbon atom amount was measured by utilizing a peak in a binding energy region near 285 eV.

The electrode plate having the structure described above is prepared in a manner such that the coated layer on the collecting element substrate is formed by repeating the coating and drying processes two or more times and, furthermore, the coating process is performed in a manner such that the thickness of the layer formed in and after the second times is in a range of 0.4 to 1.6 time the thickness of the layer already formed, or in a range of 0.6 to 1.6 times the weight ratio per unit area. As a result, electrode plates each having an improved adhesion property between the collecting element substrate formed of a metal foil and the coated layer can be obtained with high productivity. That is, in the case where the coating process is carried out in the repeated manner and the thickness of the layer newly coated on the upper portion in or after the second coating and drying process is in a range of 0.4 to 1.6 times the thickness of the layer already formed, or in a range of 0.6 to 1.6 times the weight ratio, thus obtaining the desired coated layer thickness, the thickness of the coated layer formed by the respective coating and drying processes can be made thin in comparison with the prior art technology in which the coating and drying process is performed only one time, whereby the productivity can be improved as mentioned hereunder.

For example, in a case where a coated electrode having a layer thickness of 160 $\mu$m (after drying) by repeating the coating and drying processes two times is prepared, the first coating and drying process is performed so as to obtain a layer thickness of 90 $\mu$m and the second coating and drying process is then performed so that the layer thickness is increased by 70 $\mu$m to thereby obtain the coated layer having the predetermined desired thickness of 160 $\mu$m.

On the other hand, in a case where the layer having the thickness of 160 $\mu$m is formed through only one coating and drying process, although the drying itself may be performed at a speed of 3 m/min. or more by using a 4 m drying zone, when the coating solution coated in thick is dried rapidly, a binder containing ratio on the exposed side surface of the coated layer gets higher and, in relative, the existence amount of the binder on the surface contacting to the collecting element is reduced, resulting in the formation of the coated layer having less adhesion performance. In order to prevent such defect, it will be required to dry the coated solution at a slow coating speed of less than 1 m/min.

On the contrary, in the case where the coating solution is coated on two times to form the layer thickness of first 90 $\mu$m and next of 70 $\mu$m, since the thickness after the first coating and drying process is thin thickness of 90 $\mu$m with less amount of solvent of the coated ink, the drying process can be carried out at the fast drying speed of 4 m/min. or more, thus obtaining a coated layer having a relatively desired adhesion performance. In a further process in which the second coating and drying process for the layer which is coated on the layer formed in the first time process and which has a further thickness of the layer of 70 μm to thereby obtain the total layer thickness of 160 μm, a time required for this second time drying is of about the time in the first process or less than that, so that the coated solution can be quickly dried at the drying speed of 4 m/min. or more. Furthermore, in the case of the second time coating process, since the liquid component of the coating solution coated in the second time coating process invades into fine gaps or pours of the first time coated layer and, accordingly, the binder in the coated layer or the coating solution moves towards the collecting element side, the coated layer dried in such state includes the binder on the contact surface side to the collecting element having an amount larger than that of the binder on the exposed surface side of the coated layer. Accordingly, the adhesion performance of the coated layer formed in accordance with the above first and second time coating and drying processes can be extremely improved in comparison with the case where the coated layer has the thickness of 160 μm in a one time coating and drying process as in the prior art. Still furthermore, in the case of first and second coating and drying processes carried out independently, the two times of the coating and drying processes are performed each at the drying speed of 4 m/min, which will substantially correspond to a case where the entire coating and drying process is performed at the drying speed of 2 m/min. Accordingly, in such case, the productivity can be improved two times in comparison with the case of one coating and drying process at the drying speed of 1 m/min. In this process, since a part of the binder component of the solution coated in the overlapped manner moves in the coated layer already formed, the increasing of the coated layer weight is not necessarily in proportional to the increasing of the coated layer thickness according to the kind of the active material of the ink to be used.

Further, it is to be noted that, in the coating and drying processes of the present invention, although these processes are carried out two or more than two times, it is not necessary to use two coating machines, but it may be sufficient to use only one coating machine having two coating units. Therefore, this does not lead to costs increasing for the machine, and moreover, since depreciation cost to the machine is reduced year by year, it will be said that the manufacturing cost will be reduced according to the increasing of the productivity thereof in the entire viewpoint.

Still furthermore, in the formation of the coated layer through a one time coating and drying process as in the prior art technology, since the thickened coated layer is dried by heat and air wind, the polymer as the binder may exist in an unevenly distributed manner on the exposed side of the coated layer due to the increasing of temperature, air flow amount and air flow speed. When such uneven distribution is caused with respect to the binder at the exposed surface side of the coated layer, this may result in the lowering of the adhesion performance of the coated layer to the collecting element substrate. The uneven distribution of the binder is dependent on the thickness of the layer to be coated, the drying temperature and drying air flow amount.

The coating method for forming the coated layer will be described hereunder with reference to concrete examples together with the description of the explanation how the nature of the coated layer to be finally produced is changed by the difference of the thickness of the coated layer in the respective processes. In the following description, the thickness of the layer formed through the first time coating and drying process is denoted as $T_1$, the thickness of the layer formed through the second time coating and drying process is denoted as $T_2$, and the thicknesses in the further subsequent coating and drying processes are denoted as $T_3$, $T_4$, - - - $T_n$.

When an electrode plate is produced by repeatedly coating a coating solution to obtain a coated layer having a predetermined total thickness in an overlapped coating manner, a desired coated layer having an excellent adhesion performance can be obtained through the respective coating processes with the coated thicknesses in accordance with the following equation in which the coated layer thickness in each coating process is determined to provide the thickness 0.4 to 1.6 times the thickness of the layer formed in the already performed coating process.

$0.4T_1 \leq T_2 \leq 1.6T_1$, $0.4(T_1+T_2) \leq T_3 \leq 1.6(T_1+T_2)$, $0.4(T_1+T_2+ \text{ - - - } +T_n) \leq T_n \leq 1.6(T_1+T_2+ \text{ - - - } +T_{n-1})$ However, in the case of $0.4T_1 \geq T_2$, because of less amount of the liquid component in the coating solution coated in the second time coating process, the newly coated coating solution did not hardly reach the contact surface of the coated layer to the collecting element even if the solution invades the coated layer formed through the first time coating process and the improvement in the adhesion property was not realized. Further, in the case of $1.6T_1 \leq T_2$, because the amount of the liquid component in the coating solution coated in the second time coating process is excessive and it is hence not absorbed in the coated layer formed through the first time coating process, the binder of the coated layer formed through the first time coating process is locally re-dissolved or the convection flow of the solvent is caused entirely in the coated layer. Accordingly, in this case, a coated layer having a bad adhesion performance to a degree which is obtainable through only one coating process to form a thick layer thickness is obtained. Furthermore, in the case of $0.4T_1 \geq T_2$ or $1.6T_1 \leq T_2$, the difference in the thicknesses of the coated layers formed in the respective coating processes becomes large and it becomes difficult to make short the drying times in the respective processes. In such case, no merit for performing the coating processes in plural times is achieved.

Therefore, in consideration of the above facts, according to the present invention, the coated layer having a predetermined total thickness is formed by repeatedly carrying out the coating and drying processes of the coating solution in which the coated layer having a predetermined thickness is formed and laminated in each process, and moreover, the coating process is performed in a manner such that the thickness of an upper layer formed by being coated and dried in the second time is in a range of 0.4 to 1.6 times the thickness of a lower layer already formed in the first time coating and drying process, or in a range of 0.6 to 1.6 times the weight ratio. In the case where the coating and drying processes are further increased, the thickness of the layer newly coated at each process is in a range of 0.4 to 1.6 time of the thickness of the lower layer already formed, or in a range of 0.6 to 1.6 times the weight ratio.

Further, it is to be noted that, in a case where the thickness and the weight of the layer coated in the coating process after the first time coating process are not arranged in the ranges mentioned above, according to the other aspect of the present invention, it is possible to obtain the predetermined ratio (b/a) of the amount (b) of the binder existing at the boundary portion of the side of the coated layer opposite to the side contacting the collecting element to the amount (a) of the binder existing at the boundary portion of the collecting element side of the coated layer by changing the composition ratio of the active material and the binder in the coating solution in each coating process.

Respective materials for constituting the electrode plate for secondary battery with nonaqueous electrolyte according to the present invention will be further described hereunder.

A secondary battery with nonaqueous electrolyte is characterized by using a solution of nonaqueous organic solvent as electrolyte, which is generally represented by a lithium secondary battery. For example, an electrode plate is prepared by forming a coated layer (active material layer) containing an electrode active material on a collecting element substrate formed of a metal foil, and a nonaqueous organic solvent solution is used as an electrolyte. In such a lithium secondary battery, charge-discharge can be performed through giving and taking of electrons at the time of the lithium ion movement.

The coated layer constituting the electrode plate for the secondary battery with the nonaqueous electrolyte according to the present invention is formed from an electrode coating solution containing at least an active material and a binder. As the active material for the positive electrode utilized for the present invention, the following material will be provided, for example, lithium oxide such as $LiCoO_2$, $LiNiO_2$, $LiMn_2O_2$ or the like, chalcogen compound such as $TiS_2$, $MnO_2$, $MoO_3$, $V_2O_5$ or the like, or a certain combination thereof. On the other hand, as the active material for the negative electrode, the following material will be desired to be used, for example, metal lithium, lithium alloy, or carbon material such as graphite, carbon black, acetylene black or the like. Particularly, in the use of $LiCoO_2$ as the active material for the positive electrode and carbon material as the active material for the negative electrode, a lithium series secondary battery having a considerably high discharge voltage of about 4 Volts. It is desired for these active materials to be uniformly dispersed in the coated layer. For this purpose, in the present invention, it is preferred to use powder material as the active material having a particle diameter of 1 to 100 $\mu$m and average diameter of the particles of about 10 $\mu$m.

As the binder usable for the present invention, there will be provided a thermoplastic resin, and more concretely, one of resins may be selected optionally from polyester resin, polyamide resin, polyacrylic acid ester resin, polycarbonate resin, polyurethan resin, cellulose resin, polyolefin resin, polyvinyl resin, fluoride resin, and polyimide resin. In such case, it may be possible to mix at the a same time a compound incorporated with reactive functional group (for example, monomer or oligomer of acrylate). Furthermore, as the binder, oligomer of acrylate may be solely used, or a mixture of this oligomer and monomer may be also used.

As the collecting element usable for the electrode plate for the secondary battery with nonaqueous electrolyte of the present invention, there will be provided a metal foil such as aluminum foil or copper foil generally having a foil thickness of about 10 to 30 $\mu$m.

The coating layer constituting the electrode plate for the secondary battery with nonaqueous electrolyte of the present invention will be prepared in the following manner.

First, a coating solution which is to be coated on a collecting element is prepared by using the material mentioned above. That is, the coating solution for an electrode is prepared by kneading, or dispersing and dissolving a binder and a powdery active material properly selected from the materials mentioned above with a suitable dispersion medium. In the next step, the thus prepared coating solution is coated on the collecting element substrate. There is utilized, as such coating method, gravure, gravure-reverse, die-coat, slide-coat or the like method. Thereafter, an electrode plate is prepared through a drying process for drying the coated coating solution.

In the present invention, as mentioned above, the repeatedly coated layer is formed by repeating such coating and drying process two or more than two times, not only one time as in the prior art technology. In this coated layer forming procedure, the coating and drying processes are performed such that the thickness of a newly formed portion in the second process is in a range of 0.4 to 1.6 times the thickness of a lower portion already formed in the first process, or in a range of 0.6 to 1.6 times the weight ratio. In the case where the coating and drying processes are further increased, the thickness of an each newly increased portion is in a range of 0.4 to 1.6 times the thickness of the portion already formed (or 0.6 to 1.6 times the weight ratio).

The concrete method of preparing the coating solution for an electrode containing the active material used for the present invention will be described hereunder.

A binder in form of particles and a powdery active material properly selected from the materials mentioned before are put into a dispersion medium composed of an organic solvent such as N-methyl-2-pyrolidone or toluene and then mixed therein. A conductive agent may be further added before the mixing as the occasion demands. A composition thus formed is mixed and dispersed by using a dispersing machine such as known homogenizer, ball mill, sand mill or roll mill. The coating solution is prepared through the manner mentioned above. In this process, a compounding ratio of the binder and the active material may be one in the prior art technology, and for example, it is desired that in the case of the negative electrode, binder:active material=about 2:8 to 1:9 (weight ratio) and in the case of the positive electrode, binder:active material=about 1:10 to 1:30 (weight ratio). Further, carbon materials such as graphite, carbon black, acetylene black or the like may be used as the conductive agent to be added as occasion demands.

The coating solution for the electrode containing the active material prepared in the manner described above is coated on the collecting element formed of a metal foil such as aluminum or copper by using a gravure coater, gravure reverse, die coater or the like. The coating and drying processes are repeated a plurality of times to obtain a coated and dried layer usually having a total thickness of 10 to 200 $\mu$m, preferably, 50 to 170 $\mu$m, and further preferably, 100 to 170 $\mu$m.

Furthermore, in order to further improve the uniformity of the coated layer formed through the repeated coating and drying processes, a press-treatment may be performed to the thus coated layer by using a metal roll, heating roll or sheet press machine to thereby prepare the electrode plate of the present invention. In this press-treatment, a pressing pressure of 500 to 7500 $Kgf/cm^2$ may be generally utilized, and preferably, of 3000 to 5000 $Kgf/cm^2$ will be utilized. In the case of the press pressure less than 500 $Kgf/cm^2$, it is difficult to obtain an improved uniform coated layer, and in the case of the press pressure more than 7500 $Kgf/cm^2$, the electrode plate itself including the collecting element may be damaged.

Furthermore, in the case where a secondary battery is manufactured by utilizing the electrode plate prepared in the manner mentioned above, it is desired to further carry out heating and pressure reducing treatments for removing a liquid component before the assembling of the battery.

In a case where, for example, a lithium secondary battery with the nonaqueous electrolyte is prepared by utilizing the positive and negative electrode plates of the present invention described above, a nonaqueous electrolyte in which a lithium salt as a solute is dissolved in an organic solvent is used. As the organic solvent, for example, are provided cyclic esters, chain esters, cyclic ethers and chain ethers. More in detail, examples of the cyclic esters include propylene carbonate, butylene carbonate, γ-butyrolactone, vinylene carbonate, 2-methyl-γ-butyrolactone, acetyl-γ-butyrolactone, and γ-valerolactone. Examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl ester of propionic acid, dialkyl ester of malonic acid, and alkyl ester of acetic acid. Examples of the cyclic ethers include tetrahydrofuran, alkyl tetrahydrofuran, dialkyl tetrahydrofuran, alkoxy tetrahydrofuran, dialkoxy tetrahydrofuran, 1,3-dioxolane, alkyl-1,3-dioxolane, and 1,4-dioxolane. Examples of the chain ethers include 1,2-dimethoxyethane, 1,2-diethoxyethane, dimethyl ether, ethylene glycol dialkyl ether, diethylene glycol dialkyl ether, triethylene glycol dialkyl ether, and tetraethylene glycol dialkyl ether.

Lithium salts as the solute forming the nonaqueous electrolyte together with the organic solvent include inorganic lithium salts such as $LiClO_4$, $LiBF_4$, $LiPF_6$, $LiAsF_6$, $LiCl$, and $LiBr$ and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$, and $LiOSO_2C_7F_{15}$.

The present invention will be described hereunder in more detail with reference to the following examples.

EXAMPLES

Example 1

A coating solution for the positive electrode containing the active material for the positive electrode used for the embodiment described above was prepared in the following manner.

There was used, as the coating solution for the positive electrode, in weight ratio, 89 parts by weight of $LiCoO_2$ powder as the active material with an average particle diameter of 10 μm of particles each having diameter of 1 to 100 μm, 8 parts by weight of a graphite powder as the conductive material, and 33 parts by weight of a varnish of poly-vinylidene fluoride resin as the binder (manufactured by Kureha Chemical Industry Co., LTD; KF#1100, 12% solution in N-methyl-2-pyrolidone). After adding the other powder materials to the varnish, the solution was agitated and mixed for 30 min. by using a planetary mixer (of Kodaira Seisakusho Co., LTD) to thereby obtain a coating solution in form of slurry for the positive electrode including a material for the positive electrode.

A first time coating process of the coating solution for the positive electrode was performed with a die coater by coating the thus prepared coating solution on a substrate of a collecting element formed of an aluminum foil having thickness of 20 μm and width of 300 mm. Thereafter, a drying process was performed by passing the coated substrate of the collecting element in a drying oven having length of 8 m (80° C.–100° C.–130° C.–140° C.) at a speed of 12 m/min. to thereby form a coated layer containing the active material for the positive electrode having a dried layer thickness of 60 μm on the aluminum foil substrate (coated weight 100 g/m²).

Next, a second time coating process was then performed on the coated layer formed through the above first time coating process in the like manner. Thereafter, a drying process was performed by passing the substrate of the collecting element in a drying oven having length of 8 m (80° C.–100° C.–130° C.–140° C.) at a speed of 6 m/min. to thereby form a second coated layer having a dried layer thickness of 50 μm on the first coated layer. As a result, the coated layer, including an active material for the positive electrode, having a total thickness of 110 μm (coated weight of 183 g/m²) was formed.

Thereafter, the coated layer containing the active material for the positive electrode was subjected to an ageing treatment for 48 hours in a vacuum oven at a temperature of 80° C. to remove the liquid component, thereby preparing the electrode plate for the positive electrode of the Example 1 of the present invention.

In the next step, a coating solution for the negative electrode containing the active material for the negative electrode used for the embodiment described above was prepared in the following manner.

There was used, as a material for the coating solution for the negative electrode, in weight ratio, 85 parts by weight of graphite powder, 125 parts by weight of varnish of polyvinylidene fluoride resin (manufactured by Kureha Chemical Industry Co., LTD; KF#1100, 12% solution in N-methyl-2-pyrolidone), and 115 parts by weight of N-methyl-2-pyrolidone as dispersion medium. The material for the negative electrode was dispersed by utilizing the same dispersing machine and method as those for the preparation of the coating solution for the positive electrode to thereby obtain a coating solution for the negative electrode in form of a slurry.

A first time coating process of the coating solution for the negative electrode was performed with a die coater by coating the thus prepared coating solution on a substrate of the collecting element formed of a rolled copper foil having thickness of 15 μm. Thereafter, a drying process was performed by passing the coated substrate of the collecting element in a drying oven having length of 8 m (80° C.–100° C.–130° C.–140° C.) at a speed of 12 m/min. to thereby form a coated layer containing the active material for the negative electrode having a dried layer thickness of 95 μm on the copper foil substrate (coated weight 87 g/m²).

Next, a second time coating process was then performed on the coated layer formed through the above first time coating process in the like manner. Thereafter, a drying process was performed by passing the substrate of the collecting element in a drying oven having length of 8 m (80° C.–100° C.–130° C.–140° C.) at a speed of 6 m/min. to thereby form a second coated layer having a dried layer thickness of 70 μm. As a result, the coated layer, including an active material for the negative electrode, having a total thickness of 165 μm (coated weight of 171 g/m²) was formed. Thereafter, the liquid component in the coated layer for the negative electrode thus prepared was removed in substantially the same manner as that mentioned with respect to the positive electrode, whereby the electrode plate for the negative electrode of the Example 1 of the present invention was prepared.

Example 2

First time coating process of the coating solution for the positive electrode was carried out by using the same coating solution for the positive electrode and the aluminum foil as those used in the first Example 1 and by the same manner as that of the Example 1, thereby forming the first time coated layer containing the active material for the positive electrode and having a dried layer thickness of 60 $\mu$m (coated weight of 100 g/m$^2$). Next, through the manner similar to that carried out in the first time coating process, the second time coated layer having a dried layer thickness of 60 $\mu$m was formed on the first time coated layer. As a result, the coated layer, including an active material for the positive electrode, having a total thickness of 120 $\mu$m (coated weight of 200 g/m$^2$) was formed.

Thereafter, the coated layer containing the active material for the positive electrode was subjected to an ageing treatment for 48 hours in a vacuum oven at a temperature of 80° C. to remove the liquid component, thereby preparing the electrode plate for the positive electrode of the Example 2 of the present invention.

In the next step, a coating solution for the negative electrode containing the active material for the negative electrode used for the embodiment described above was prepared in the following manner.

There was used, as a material for the coating solution for the negative electrode, in weight ratio, 90 parts by weight of carbone powder (Carbotron P manufactured by Kureha Chemical Industry Co., LTD), 83 parts by weight of varnish of polyvinylidene fluoride resin (manufactured by Kureha Chemical Industry Co., LTD; KF#1100, 12% solution in N-methyl-2-pyrolidone), and 152 parts by weight of N-methyl-2-pyrolidone as dispersion medium. The material for the negative electrode was dispersed by utilizing the same dispersing machine and method as those for the preparation of the coating solution for the positive electrode to thereby obtain a coating solution for the negative electrode in form of a slurry.

A first time coating process of the coating solution for the negative electrode was performed by coating the thus prepared coating solution on a substrate of a collecting element formed of a rolled copper foil having thickness of 15 $\mu$m. Thereafter, a drying process was performed by passing the coated collecting element substrate in a drying oven having length of 8 m (80° C.–100° C.–130° C.–140° C.) at a speed of 12 m/min. to thereby form a coated layer containing the active material for the negative electrode having a dried layer thickness of 70 $\mu$m on the copper foil substrate (coated weight 64 g/m$^2$).

Next, a second time coating process was then performed on the coated layer formed through the above first time coating process in the like manner. Thereafter, a drying process was performed by passing the substrate of the collecting element in a drying oven having length of 8 m (80° C.–100° C.–130° C.–140° C.) at a speed of 6 m/min. to thereby form a second coated layer having a dried layer thickness of 70 $\mu$m. As a result, the coated layer, including an active material for the negative electrode, having a total thickness of 140 $\mu$m (coated weight of 145 g/m$^2$) was formed. Thereafter, the liquid component in the coated layer for the negative electrode thus prepared was removed in substantially the same manner as that mentioned with respect to the positive electrode, whereby the electrode plate for the negative electrode of the Example 2 of the present invention was prepared.

Example 3

An electrode was prepared by using substantially the same coating solution as that in the Example 1 in substantially the same coating method and drying condition as those of the Example 1 except that, for the positive electrode, the coated layer thickness in the first coating process was 60 $\mu$m (coated layer weight of 100 g/m$^2$) and that in the second coating process was 70 $\mu$m, in total, 130 $\mu$m (coated layer weight of 217 g/cm$^2$).

On the other hand, for the negative electrode, the coated layer thickness in the first coating process was 70 $\mu$m (coated layer weight of 64 g/m$^2$) and that in the second coating process was 75 $\mu$m, in total, 145 $\mu$m (coated layer weight of 150 g/m$^2$). Thereafter, as in the Example 1, vacuum drying process was performed to thereby obtain the positive and negative electrode plates.

Example 4

An electrode was prepared by using substantially the same coating solution as that in the Example 1 in substantially the same coating method as that of the Example 1 except that the coating process was repeated three times. The drying processes were performed by using the drying oven having a length of 8 m (80° C.–100° C.–130° C.–140° C.) at a drying speed of 16 m/min. (first drying), 12 m/min. (second drying) and 6 m/min (third drying).

In the preparation of the positive electrode, the thickness of the first coated layer was 35 $\mu$m, that of the second coated layer was 40 $\mu$m and that of the third coated layer was 70 $\mu$m (145 $\mu$m in total, coated layer weight of 242 g/m$^2$ in total). In the preparation of the negative electrode, the thickness of the first coated layer was 35 $\mu$m, that of the second coated layer was 50 $\mu$m and that of the third coated layer was 70 $\mu$m (155 $\mu$m in total coated layer weight of 160 g/m$^2$ in total). Thereafter, as in the Example 1, vacuum drying process was performed to thereby obtain the positive and negative electrode plates.

An example, in which composition ratio of the binder and the active material in a coating solution is changed in each coating solution for forming each of the coated layers after the first time coating and drying process, will be described hereunder as Example 5.

Example 5

A coating solution for the positive electrode containing the active material for the positive electrode used for the Example 5 was prepared in the following manner.

There was used, as the first time coating solution for the coated layer for the positive electrode, in weight ratio, 88 parts by weight of LiCoO$_2$ powder with an average particle diameter of 20 $\mu$m of particles each having diameter of 1 to 100 $\mu$m, 4 parts by weight of a graphite powder as the conductive material, 50 parts by weight of a varnish of poly-vinylidene fluoride resin as the binder (KF#1100 manufactured by Kureha Chemical Industry Co, LTD, 12% solid component in N-methyl-2-pyrolidone), and 5 parts by weight of N-methyl-2-pyrolidone. The thus prepared mixture was agitated and mixed for 30 min. by using a planetary mixer (Kodaira Seisakusho Co. LTD) to thereby obtain a material containing the active material for the positive electrode in form of slurry.

A first time coating process of the thus prepared active material coating solution for the positive electrode was performed with a slot die coater by coating the coating solution on a substrate of a collecting element formed of an aluminum foil having thickness of 20 $\mu$m and width of 300 mm.

Thereafter, a drying process was performed by passing the coated substrate of the collecting element in a drying oven having length of 8 m (100° C.–120° C.–130° C.–140° C.) at a speed of 12 m/min. to thereby form a first coated layer containing the active material for the positive electrode having a dried layer thickness of 40 μm on the aluminum foil substrate.

Next, a second time coating and drying process was then performed on the coated layer formed through the above first time coating process in the like manner except that weight ratio of the varnish and drying speed were changed. That is, as the binder, there was used 17 parts by weight of the varnish of poly-vinylidene fluoride resin, and the other components were the same as those in the first time coating solution. The drying speed was 6 m/min. A coated layer containing the active material for the positive electrode had a total dried layer thickness of 80 μm.

In the next step, a coating solution for the negative electrode containing the active material for the negative electrode used for the Example 5 was prepared in the following manner.

There was used, as a material for the first time coating solution for the negative electrode, in weight ratio, 85 parts by weight of graphite powder as the active material for the negative electrode and 94 parts by weight of the vanish of poly-vinylidene fluoride resin as the binder (KF#1100 manufactured by Kureha Chemical Industry Co. LTD, 12% solid component in N-methyl-2-pyrolidone), and 5 parts by weight of N-methyl-2-pyrolidone as dispersion medium. The thus prepared mixture was dispersed by using a dispersing machine as in the preparation of the positive electrode to thereby obtain a coating solution in a form of slurry.

A first time coating process of the above coating solution for the negative electrode was performed in the manner like that for the positive electrode. The thus prepared first time coating solution was coated on a rolled copper foil having a thickness of 15 μm and a width of 300 mm by using a die coater. Thereafter, a drying process was performed by passing the coated substrate of the collecting element in a drying oven having length of 8 m (100° C.–120° C.–130° C.–140° C.) at a speed of 12 m/min. to thereby form a first coated layer containing the active material for the negative electrode having a dried layer thickness of 60 μm on the copper foil substrate.

Next, a second time coating and drying process was then performed on the coated layer formed through the above first time coating process in the like manner except that weight ratio of the vanish and drying speed were changed. That is, as the binder, there was used 31 parts by weight of the vanish of poly-vinylidene fluoride resin, and the other components were the same as those in the first time coating solution. The drying speed was 6 m/min. A second coated layer containing the active material for the negative electrode had a dried layer total thickness of 120 μm.

Comparative Example 1

An electrode was prepared by using substantially the same coating solution as that in the Example 1 in substantially the same coating method and drying condition as those of the Example 1 except that, for the positive electrode, the thickness of the first coated layer was 40 μm (coated layer weight of 67 g/m²) and that of the second coated layer was 70 μm (110 μm in total, coated layer weight of 183 g/m² in total). For the negative electrode, the thickness of the first coated layer was 50 μm (coated layer weight of 46 g/m²) and that of the second coated layer was 85 μm (135 μm in total, coated layer weight of 140 g/m² in total). Thereafter, as in the Example 1, vacuum drying process was performed to thereby obtain the positive and negative electrode plates.

Comparative Example 2

An electrode was prepared by using substantially the same coating solution as that in the Example 1 in substantially the same coating method as that of the Example 1 except that, for both the positive and negative electrodes, the coated layer was formed through only one coating process, and the drying process was performed by passing through the drying oven having a length of 8 m (80° C.–100° C.–130° C.–140° C.) at a coating speed of 6 m/min. The coated layer for the positive electrode had a thickness of 110 μm (coated layer weight of 183 g/m²) and the coated layer for the negative electrode had a thickness of 135 μm (coated layer weight of 139 g/m²). Thereafter, as in the Example 1, vacuum drying process was performed to thereby obtain the positive and negative electrode plates.

Adhesion Evaluation

With respect to the electrode plates prepared through the above Examples 1–5 and Comparative examples 1–2, the adhesion performances of the coated and dried layer with respect to the collecting elements were compared and evaluated, and the following results were obtained. For this purpose, a cross-cut adhesion test (100 numbers of cross cuts each with an interval of 1 mm formed by means of cutter and remaining numbers of the square portions are evaluated) was carried out.

| Kind of Coated Layer | | Result of Cross-Cut Test (numbers) |
|---|---|---|
| Example 1 | Positive Electrode | 100 |
| | Negative Electrode | 100 |
| Example 2 | Positive Electrode | 100 |
| | Negative Electrode | 100 |
| Example 3 | Positive Electrode | 100 |
| | Negative Electrode | 100 |
| Example 4 | Positive Electrode | 100 |
| | Negative Electrode | 100 |
| Example 5 | Positive Electrode | 100 |
| | Negative Electrode | 100 |
| Comparative 1 | Positive Electrode | 90 |
| | Negative Electrode | 70 |
| Comparative 2 | Positive Electrode | 80 |
| | Negative Electrode | 0 |

Result of Surface Elemental Analysis

Fluorine atom amounts in the exposed surface side of the coated layers and those in the contacting surface side thereof were measured by using a device (ESCALAB 220i-XL manufactured by FISONS Instruments and ESCASCOPE by VACUUM GENERATOR SCIENTIFIC) through the X-ray photoelectron spectroscopy (X-ray PS). In the measurement, Kα1, 2 of Al was used as an X-ray source with the X-ray output of 15 kV, 35 mA and the measured region of 1100 μmφ.

The fluorine amounts were calculated with cobalt atom amount being the reference for the positive electrode and carbon atom amount being the reference for the negative electrode, and a value (fluorine atom amount in the exposed surface/fluorine atom amount in the contacting surface) was obtained. The following results were obtained.

|  |  | Binder Amount Ratio (b/a)* |
| --- | --- | --- |
| Example 1 | Positive Electrode | 0.9 |
|  | Negative Electrode | 1.0 |
| Example 2 | Positive Electrode | 1.0 |
|  | Negative Electrode | 1.1 |
| Example 3 | Positive Electrode | 1.2 |
|  | Negative Electrode | 0.8 |
| Example 4 | Positive Electrode | 1.7 |
|  | Negative Electrode | 1.6 |
| Example 5 | Positive Electrode | 1.1 |
|  | Negative Electrode | 1.3 |
| Comparative 1 | Positive Electrode | 2.0 |
|  | Negative Electrode | 2.1 |
| Comparative 2 | Positive Electrode | 2.0 |
|  | Negative Electrode | 2.8 |

*b:(Fluorine Atom Amount at Exposed-side Boundary Portion)
a:(Fluorine Atom at Contact-side Boundary Portion)

What is claimed is:

1. An electrode plate for a secondary battery with nonaqueous electrolyte comprising a collector and a coated layer formed on the collector by coating a coating solution containing at least an active material for a battery and a binder on the collector and then drying the same, wherein said coated layer of the coating solution has a thickness of 80 $\mu$m or more, and the coated layer having the thickness of 80 $\mu$m or more is formed by repeating a set of steps of coating the coating solution on said collector and then drying the same by at least two sets and by increasing the thickness of the coated layer in each set of these steps after the second coating and drying steps by an amount in a range of 0.4 to 1.6 times a thickness of a coated layer already formed in the preceding coating and drying steps, and wherein a ratio (b/a) of an amount (b) of a binder existing at a boundary portion of the coated layer on a side opposite to a collector side boundary portion to an amount (a) of a binder existing at a boundary portion of the coated layer contacting the collector is 0.05 or more and less than 2.

2. An electrode plate according to claim 1, wherein the binder is a fluorine series resin and the electrode plate is an electrode plate for a lithium ion secondary battery in which electrons are given and taken through movement of lithium ions.

3. An electrode plate according to claim 1, wherein the binder is a fluorine series resin and wherein a fluorine atom amount related to the binder existing at the boundary portion of the coated layer contacting the collector and a fluorine atom amount related to the binder existing at the boundary portion of the coated layer on the side opposite to the collector side boundary portion are measured by an X-ray photoelectron spectroscopy, a composition ratio of an existence amount of atoms, other than the fluorine atom, contained in the active material to the existence amount of the fluorine atom at each of the measured portions is measured, and when the existence amounts of the fluorine atoms at both the measured portions are compared with the existence amount of the atoms other than the fluorine atom contained in the active material being a reference, a ratio of an amount of the fluorine atom amount related to the binder existing at a boundary portion of the coated layer opposite to the collector side portion of the coated layer to an amount of the fluorine atom amount related to the binder existing at a boundary portion of the coated layer contacting to the collector side is 0.05 or more and less than 2.

4. An electrode plate according to claim 3, wherein said electrode plate is a positive electrode plate and the atom as the reference to compare the existence amounts of the fluorine atoms at both the boundary portions of the coated layer is an atom selected from a group consisting of cobalt, nickel, manganese, vanadium and chromium.

5. An electrode plate according to claim 4, wherein the binder is a polyvinylidene fluoride and the existence amount of the fluorine atom to be compared is detected from a peak in a range of a bonding energy of 685 to 962 eV.

6. An electrode plate according to claim 3, wherein said electrode plate is a negative electrode plate and the atom as the reference to compare the existence amounts of the fluorine atoms at both the boundary portions of the coated layer is a carbon atom contained in an organic material in the coated layer.

7. An electrode plate according to claim 6, wherein the binder is a polyvinylidene fluoride and the existence amount of the fluorine atom to be compared is detected from a peak in a range of a bonding energy of 685 to 962 eV.

8. A method of manufacturing an electrode plate for a secondary battery with nonaqueous electrolyte comprising a collector and a coated layer formed on the collector by coating a coating solution containing at least an active material for a battery and a binder on the collector and then drying the same, wherein a ratio (b/a) of an amount (b) of a binder existing at a boundary portion of the coated layer on a side opposite to a collector side to an amount (a) of a binder existing at a boundary portion of the coated layer contacting the collector is 0.05 or more and less than 2, the method comprising the step of forming a coated layer having a predetermined thickness by repeating at least two times of coating and drying processes for coating the coating solution for the electrode plate containing on the collector and then drying the same, wherein a thickness of a coated layer formed in a second time or more than second time coating and drying processes is increased by an amount in a range of 0.4 to 1.6 time of a thickness of a coated layer already formed in preceding coating and drying processes.

9. A method of manufacturing an electrode plate according to claim 8, wherein the binder is a poly-vinylidene fluoride.

10. A method of manufacturing an electrode plate for a secondary battery with nonaqueous electrolyte comprising a collector and a coated layer formed on the collector by coating a coating solution at least containing an active material for a battery and a binder on the collector and then drying the same, wherein a ratio (b/a) of an amount (b) of a binder existing at a boundary portion of the coated layer on a side opposite to a collector side to an amount (a) of a binder existing at a boundary portion of the coated layer contacting the collector is 0.05 or more and less than 2, the method comprising the step of forming a coated layer having a predetermined thickness by repeating at least two times of coating and drying processes for coating the coating solution for the electrode plate on the collector and then drying the same, wherein an increased amount in weight per unit area of the coated layer formed in a second time or more than second time coating and drying processes is in a range of 0.6 to 1.6 time of a weight per unit area of a coated layer already formed in preceding coating and drying processes.

11. A method of manufacturing an electrode plate according to claim 10, wherein the binder is a poly-vinylidene fluoride.

12. A method of manufacturing an electrode plate for a secondary battery with nonaqueous electrolyte comprising a collector and a coated layer formed on the collector by coating a coating solution at least containing an active material for a battery and a binder on the collector and then drying the same, wherein a ratio (b/a) of an amount (b) of a binder existing at a boundary portion of the coated layer on a side opposite to a collector side to an amount (a) of a binder existing at a boundary portion of the coated layer contacting the collector is 0.05 or more and less than 2, the method comprising the step of forming a coated layer having a predetermined thickness by repeating at least two times of coating and drying processes for coating the coating solution for the electrode plate on the collector and then drying the same, wherein, in order to adjust the ratio (b/a) of the binder amounts at both the boundary portions of the coated layer, coating solutions having different composition ratios of the active materials and the binders are used for each set of the respective coating and drying processes.

13. A method of manufacturing an electrode plate according to claim 12, wherein the binder is a poly-vinylidene fluoride.

14. An electrode plate for a secondary battery with nonaqueous electrolyte comprising a collector and a coated layer formed on the collector by coating a coating solution containing at least an active material for a battery and a binder on the collector and then drying the same, wherein said coated layer of the coating solution has a thickness of 80 µm or more and the coated layer having the thickness of 80 µm or more is formed by repeating a set of steps of coating the coating solution on said collector and then drying the same by at least two sets and increasing weight per unit area of the coated layer formed in each set of these steps after the second time coating and drying steps by an amount in a range of 0.6 to 1.6 times a weight of a coated layer already formed in the preceding coating and drying processes, and wherein a ratio (b/a) of an amount (b) of a binder existing at a boundary portion of the coated layer on a side opposite to a collector side boundary portion to an amount (a) of a binder existing at a boundary portion of the coated layer contacting the collector is 0.05 or more and less than 2.

15. An electrode plate according to claim 14, wherein the binder is a fluorine series resin and the electrode plate is an electrode plate for a lithium ion secondary battery in which electrons are given and taken through movement of lithium ions.

16. An electrode plate according to claim 14, wherein the binder is a fluorine series resin and wherein a fluorine atom amount related to the binder existing at the boundary portion of the coated layer contacting the collector and a fluorine atom amount related to the binder existing at the boundary portion of the coated layer on the side opposite to the collector side boundary portion are measured by an x-ray photoelectron spectroscopy, a composition ratio of an existence amount of atoms, other than the fluorine atom, contained in the active material to the existence amount of the fluorine atom at each of the measured portions is measured, and when the existence amounts of the fluorine atoms at both the measured portions are compared with the existence amount of the atoms other than the fluorine atom contained in the active material being a referenced, a ratio of an amount of the fluorine atom amount related to the binder existing at a boundary portion of the coated layer opposite to the collector side portion of the coated layer to an amount of the fluorine atom amount related to the binder existing at a boundary portion of the coated layer contacting to the collector side is 0.05 or more and less than 2.

17. An electrode plate according to claim 16, wherein said electrode plate is a positive electrode plate and the atom as the reference to compare the existence amounts of the fluorine atoms at both the boundary portions of the coated layer is an atom selected from a group consisting of cobalt, nickel, manganese, vanadium and chromium.

18. An electrode plate according to claim 17, wherein the binder is a polyvinylidene fluoride and the existence amount of the fluorine atom to be compared is detected from a peak in a range of a bonding energy of 685 to 962 eV.

19. An electrode plate according to claim 16, wherein said electrode plate is a negative electrode plate and the atom as the reference to compare the existence amounts of the fluorine atoms at both the boundary portions of the coated layer is a carbon atom contained in an organic material in the coated layer.

20. An electrode plate according to claim 19, wherein the binder is a polyvinylidene fluoride and the existence amount of the fluorine atom to be compared is detected from a peak in a range of a bonding energy of 685 to 962 eV.

21. An electrode plate for a secondary battery with nonaqueous electrolyte comprising a collector and a coated layer formed on the collector by coating a coating solution containing at least an active material for a battery and a binder on the collector and then drying the same, wherein said coated layer of the coating solution has a thickness of 80 µm or more, and the coated layer having the thickness of 80 µm or more is formed by repeating a set of steps of coating the coating solution on said collector and then drying the same by at least two sets, and by using, in each set of steps after the second coating and drying steps, a coating solution having a concentration of the binder lower than that used in the preceding coating and drying steps, and wherein a ratio (b/a) of an amount (b) of a binder existing at a boundary portion of the coated layer on a side opposite to a collector side boundary portion to an amount (a) of a binder existing at a boundary portion of the coated layer contacting the collector is 0.05 or more and less than 2.

22. An electrode plate according to claim 21, wherein the binder is a fluorine series resin and the electrode plate is an electrode plate for a lithium ion secondary battery in which electrons are given and taken through movement of lithium ions.

23. An electrode plate according to claim 21, wherein the binder is a fluorine series resin and wherein a fluorine atom amount related to the binder existing at the boundary portion of the coated layer contacting the collector and a fluorine atom amount related to the binder existing at the boundary portion of the coated layer on the side opposite to the collector side boundary portion are measured by an x-ray photoelectron spectroscopy, a composition ratio of an existence amount of atoms, other than the fluorine atom, contained in the active material to the existence amount of the fluorine atom at each of the measured portions is measured, and when the existence amounts of the fluorine atoms at both the measured portions are compared with the existence amount of the atoms other than the fluorine atom contained in the active material being a reference, a ratio of an amount of the fluorine atom amount related to the binder existing at a boundary portion of the coated layer opposite to the collector side portion of the coated layer to an amount of the fluorine atom amount related to the binder existing at a boundary portion of the coated layer contacting to the collector side is 0.05 or more and less than 2.

24. An electrode plate according to claim 23, wherein said electrode plate is a positive electrode plate and the atom as the reference to compare the existence amounts of the fluorine atoms at both the boundary portions of the coated layer is an atom selected from a group consisting of cobalt, nickel, manganese, vanadium and chromium.

25. An electrode plate according to claim 24, wherein the binder is a polyvinylidene fluoride and the existence amount of the fluorine atom to be compared is detected from a peak in a range of a bonding energy of 685 to 962 eV.

26. An electrode plate according to claim 23, wherein said electrode plate is a negative electrode plate and the atom as the reference to compare the existence amounts of the fluorine atoms at both the boundary portions of the coated layer is a carbon atom contained in an organic material in the coated layer.

27. An electrode plate according to claim 26, wherein the binder is a polyvinylidene fluoride and the existence amount of the fluorine atom to be compared is detected from a peak in a range of a bonding energy of 685 to 962 eV.

* * * * *